(12) United States Patent
Kuhlhoff et al.

(10) Patent No.: US 12,072,051 B2
(45) Date of Patent: Aug. 27, 2024

(54) FLUID LINE COUPLING

(71) Applicant: ContiTech Techno-Chemie GmbH, Karben (DE)

(72) Inventors: Florian Kuhlhoff, Hamburg (DE); Amin Eltaief, Hamburg (DE)

(73) Assignee: ContiTech Techno-Chemie GmbH, Karben (DE)

( * ) Notice: Subject to any disclaimer, the term of this patent is extended or adjusted under 35 U.S.C. 154(b) by 75 days.

(21) Appl. No.: 17/906,615

(22) PCT Filed: Mar. 17, 2021

(86) PCT No.: PCT/DE2021/200034
§ 371 (c)(1),
(2) Date: Sep. 16, 2022

(87) PCT Pub. No.: WO2021/185419
PCT Pub. Date: Sep. 23, 2021

(65) Prior Publication Data
US 2023/0135793 A1    May 4, 2023

(30) Foreign Application Priority Data
Mar. 18, 2020 (DE) ................ 10 2020 203 433.8

(51) Int. Cl.
*F16L 37/098* (2006.01)
(52) U.S. Cl.
CPC ....... *F16L 37/0982* (2013.01); *F16L 37/0985* (2013.01); *F16L 2201/10* (2013.01)

(58) Field of Classification Search
CPC ............... F16L 37/0982; F16L 37/0985; F16L 2201/10; F16L 37/086; F16L 37/0887; F16L 37/12; F16L 37/0845; F16L 37/138
See application file for complete search history.

(56) References Cited

U.S. PATENT DOCUMENTS

| | | | |
|---|---|---|---|
| 5,915,738 A * | 6/1999 | Guest | F16L 37/0982 |
| 6,283,443 B1 | 9/2001 | Taneya | |
| 9,333,950 B2 * | 5/2016 | Opel | F16L 37/086 |
| 9,599,267 B2 * | 3/2017 | Dude | F16L 37/0982 |
| 2005/0221679 A1 * | 10/2005 | Takayanagi | F16L 37/0985 |
| 2010/0213702 A1 * | 8/2010 | Ishii | F16L 37/0982 |
| 2010/0276924 A1 | 11/2010 | Gillet et al. | |
| 2012/0169044 A1 * | 7/2012 | Kendrick | |

(Continued)

FOREIGN PATENT DOCUMENTS

| | | |
|---|---|---|
| DE | 202004016097 U1 | 2/2006 |
| DE | 102014107530 A1 | 12/2015 |

OTHER PUBLICATIONS

International Search Report and Written Oppinion dated Jun. 22, 2021 of International Application PCT/E2021/200034 on which this application is based.

*Primary Examiner* — William S. Choi
(74) *Attorney, Agent, or Firm* — Gregory J. Adams; Richard A. Wolf

(57) ABSTRACT

A reversibly detachable fluid line coupling (1), at least having a coupling sleeve (2), a locking element (3) and a coupling plug (4) with a locking collar (41). The reversibly detachable fluid line coupling has a locking state of which can easily be checked automatically. This coupling has actuating/signaling surfaces (312) which are only visible when the coupling is in the unlocked state.

7 Claims, 5 Drawing Sheets

(56) References Cited

U.S. PATENT DOCUMENTS

| | | | |
|---|---|---|---|
| 2016/0025252 A1* | 1/2016 | Tran | F16L 37/086 |
| 2016/0201835 A1 | 7/2016 | Jones et al. | |
| 2017/0363237 A1 | 12/2017 | Pepe et al. | |
| 2019/0242510 A1* | 8/2019 | Klein | F16L 37/0985 |

* cited by examiner

FLUID LINE COUPLING

FIELD OF THE INVENTION

The invention relates to a reversibly detachable fluid line coupling, at least having a coupling sleeve, a locking element and a coupling plug with a locking collar.

BRIEF SUMMARY

Fluid line couplings of the stated type are used in multiple applications. One important field of application is automotive engineering. There, use is often made of SAE couplings, that is to say couplings with standardized plug geometries.

Such couplings can be plugged into one another and latched relatively securely because of the large guide length of the plug. With this type of coupling, however, it can be difficult to see whether the coupling plug is also correctly latched in the coupling sleeve. Although secure latching can be checked mechanically, this means an increased effort during assembly and is not easy to automate either. US 2017/0363237 A1 discloses such a coupling.

In addition, generic couplings are also known which have an optical latching indicator such that the correct fit of the coupling plug is visible. US 2016/0201835 A1 shows such a coupling. Here, however, two locking elements are necessary, which have to engage in one another, which can lead to a tilting of the elements in the event of an axial load that occurs when the coupling plug is inserted, and therefore latching is not achieved. While such a failure is visible in the disclosed embodiment, it is not desired.

US 2010/0276924 A1 also discloses a fluid line coupling with a display of the locking state. Although the subject matter of this document has a visual display in the form of an element protruding from the coupling, this only signals whether the locking has been actuated. Manual reworking is necessary here in any case.

The invention was based on the object of creating a fluid line coupling of the type described at the outset, the latching state of which can easily be checked automatically, with a visual check being preferred.

This object is achieved in that:
the coupling sleeve has a collar which faces axially outward from a first opening provided for the insertion of the coupling connector and is spaced apart from the insertion opening,
the coupling sleeve has a predetermined number of openings in its outer wall, and
the locking element is arranged axially displaceably inside the coupling sleeve and has a number of resilient locking arms that corresponds to the number of openings in the coupling sleeve,
the locking arms being distributed on the circumference of the locking element and extending in the axial direction and having actuating/signaling surfaces facing radially outward at their axial ends, and
the actuating/signaling surfaces correspond in shape and position to the openings in the coupling sleeve and protrude resiliently through the openings in the coupling sleeve radially outward from the coupling sleeve,
the fluid line coupling has a blocking ring enclosing the coupling sleeve, the blocking ring having a base part, a spring part and a blocking part, and the base part and blocking part being resiliently variably spaced apart in the axial direction by means of the spring part, and
the blocking ring has an inner diameter that can be slid over the outer circumference of the coupling sleeve with little play,
the play between the coupling sleeve and the blocking part being dimensioned in such a way that the blocking part cannot be slid over the actuating/signaling surfaces protruding from the openings in the coupling sleeve,
the actuating/signaling surfaces have a different color from the blocking part of the blocking ring,
the blocking ring being arranged in the preassembled state on the coupling sleeve in such a way that the base part is supported on the support collar of the coupling sleeve, the blocking part is supported against the actuating/signaling surfaces protruding from the openings in the coupling sleeve, and the spring part is pushed together axially, as a result of which an axial spring force is effective between the base part and blocking part, and,
when the coupling connector is pushed in and locked, the actuating/signaling surfaces are displaced in the direction of the interior of the coupling sleeve to such an extent that they no longer protrude from the openings in the coupling sleeve, but are still prevented from sliding out of the coupling sleeve axially by the wall of the coupling sleeve, and therefore the blocking part of the blocking ring is released and is displaced beyond the actuating/signaling surfaces in the direction of the push-in opening by the spring force of the spring part of the blocking ring such that the actuating/signaling surfaces are no longer visible and are also no longer displaceable radially outward from the openings in the coupling sleeve.

An arrangement of this type makes it possible to optically signal the locking state of a coupling of the type in question. Only when the coupling is locked are the actuating/signaling surfaces displaced in the direction of the interior of the coupling sleeve and only then can the blocking part slide over the actuating/signaling surfaces. Since the actuating/signaling surfaces have a different color, this change can be easily detected with a camera, even from any viewing angles. This check can thus be fully automated.

In a development of the invention, the transition from the locking arms to the radially outwardly directed actuating/signaling surfaces at least partially has a slope.

With an axial displacement of the blocking ring in the coupling sleeve in the direction away from the insertion opening, the transition regions slide over the edges of the openings in the coupling sleeve. The smooth transition ensures that the locking arms are pressed into the interior of the coupling sleeve during said movement, with the actuating/signaling surfaces also being pulled inward.

In one development of the invention, the locking arms have radially inwardly facing blocking lugs at their axial ends opposite the actuating/signaling surfaces.

The blocking lugs engage upon an axial displacement of the locking element and associated displacement of the ends of the locking arms inward over the blocking collar of the coupling connector. Since the actuating/signaling surfaces are still supported axially on the wall of the coupling sleeve, the assembly of locking element and coupling plug can no longer be pulled out of the coupling sleeve. Only when the blocking part of the blocking ring is manually pushed back is it possible for the locking arms to spring apart again such that the coupling is detachable again.

In a development of the invention, a predetermined number of locking arms have insertion aids in the form of bevels arranged in the axial direction on their blocking lugs, and said blocking lugs protrude radially into the interior of the coupling sleeve to such an extent that, when the coupling connector is pushed in, the locking collar butts against the bevels and therefore the blocking lugs are displaceable radially outward.

Since, when a coupling connector is pushed in, the actuating/signaling surfaces have to be displaced outward in this way, this is thus not possible if the blocking part of the blocking ring is in an incorrect starting position so that the coupling connector cannot be pushed into the coupling sleeve. This ensures that the incorrect starting position of the blocking part is not misinterpreted as a correctly locked coupling.

In a development of the invention, the locking arms not having insertion aids at the radial ends of their blocking lugs each have a guide web which extends in the axial direction.

The guide webs ensure that the coupling connector is introduced rectilinearly, so that it does not tilt when it is inserted.

In a development of the invention, the locking element has axially aligned longitudinal stops in the interior.

The driver webs are used to reliably displace the locking element, when the coupling plug is inserted in the axial direction, from the insertion opening in the coupling sleeve into the coupling sleeve in order to reliably ensure that the actuating/signaling surfaces are pulled in. The locking collar butts against the driver webs and thereby pushes the locking element in front of it into the coupling sleeve.

In a development of the invention, the locking arms having guide webs each have blocking lugs pointing axially in the direction of the insertion opening in the coupling and spaced radially from the guide webs, the distance between the respective guide web and blocking lug being dimensioned such that the wall of the coupling sleeve can engage in the region of the openings between the guide web and the blocking lug.

The blocking lugs prevent the engaging locking arms from not accidentally being able to be pressed slightly into the interior of the coupling housing, when the coupling connector is displaced, in order to avoid the blocking ring sliding over the signaling surfaces although no coupling connector is inserted.

In a development of the invention, all the components of the fluid line coupling are formed from plastic.

The components of a fluid line coupling according to the invention can be easily produced, for example, by injection molding. Plastic has good spring properties and can easily be colored.

Figure 8:
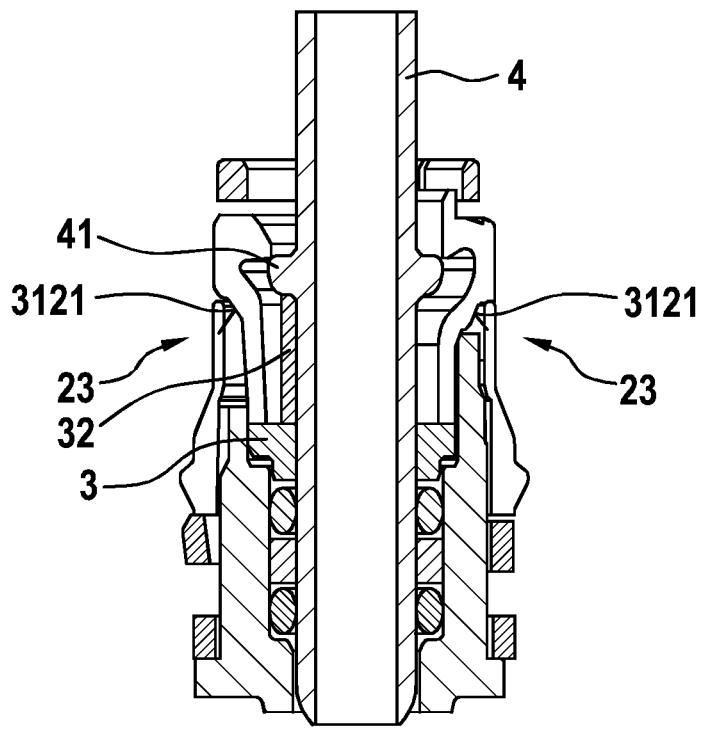

As it is pushed in further, a state that is shown in FIG. 8 is established.

Figure 9:
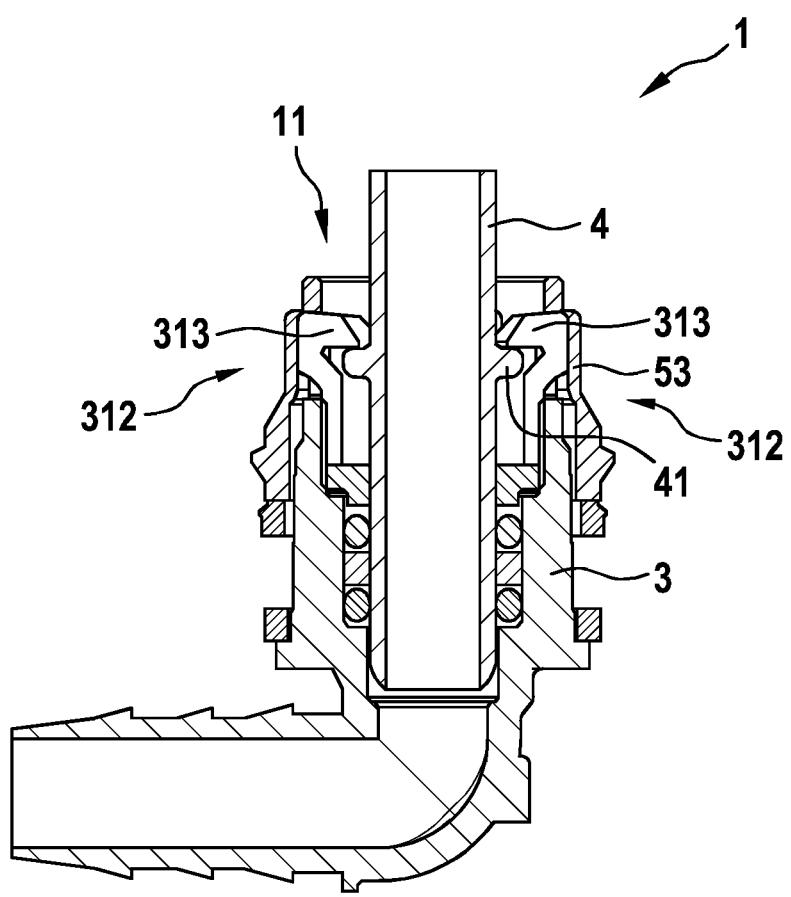

FIG. 9 shows the locked state of the fluid line coupling 1.

DETAILED DESCRIPTION

An exemplary embodiment of the invention will be discussed in more detail below on the basis of the drawing.

Figure 1:
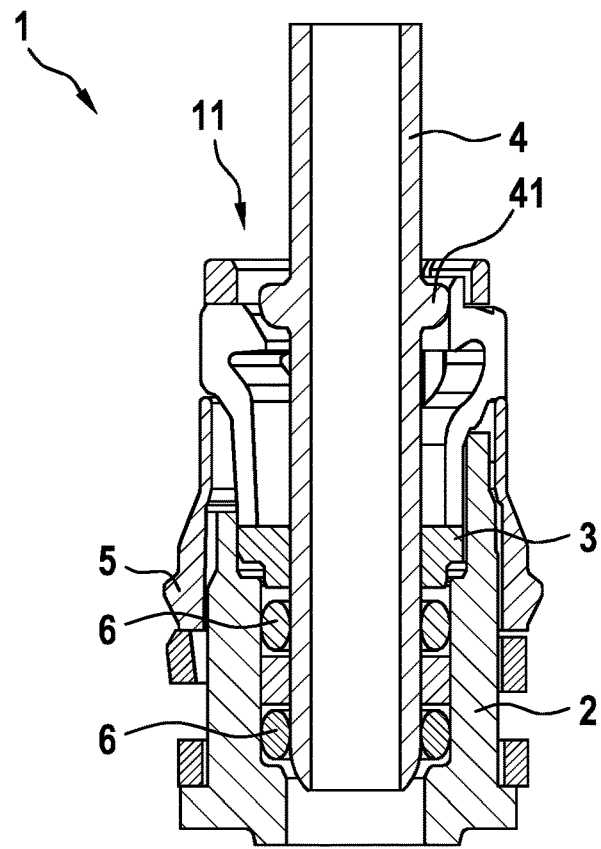
FIG. 1 illustrates a fluid line coupling 1 according to the invention in a section.

FIG. 1 illustrates a fluid line coupling 1 according to the invention in a section. The coupling 1 has a coupling sleeve 2, a locking element 3, a coupling connector 4, a blocking ring 5 and two seals 6. Furthermore, the coupling has an insertion opening 11 which is provided for inserting the coupling connector. The O-ring seals 6 ensure a secure seal between the coupling sleeve 2 and the coupling connector 4 when the coupling connector 4 is inserted. In this illustration, the coupling connector 4 is inserted into the coupling sleeve, but not locked. The coupling connector 4 has a blocking collar 41.

The individual parts of the coupling 1 will be explained in more detail below.

Figure 2:
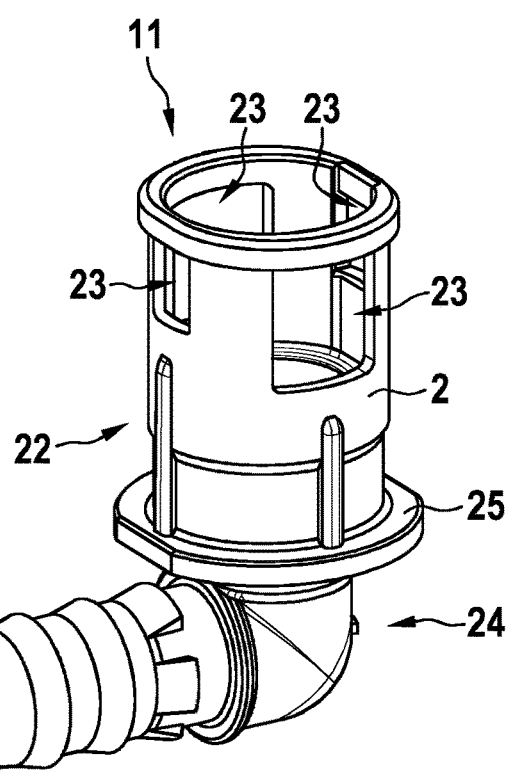
In FIG. 2, the coupling sleeve 2 is shown by itself in a perspective view.

In FIG. 2, the coupling sleeve 2 is shown by itself in a perspective view. The coupling sleeve has a wall 22 with four openings 23. A connection region 24 for connection to a further fluid line, not shown here, is arranged on the coupling sleeve 2 opposite the insertion opening 11. In the present example, the connection region 24 is angled by 90°, but may be oriented in all conceivable positions. A stop collar 25 facing radially outward is arranged at the end of the coupling sleeve 3 assigned to the connection region 24.

Figure 3:
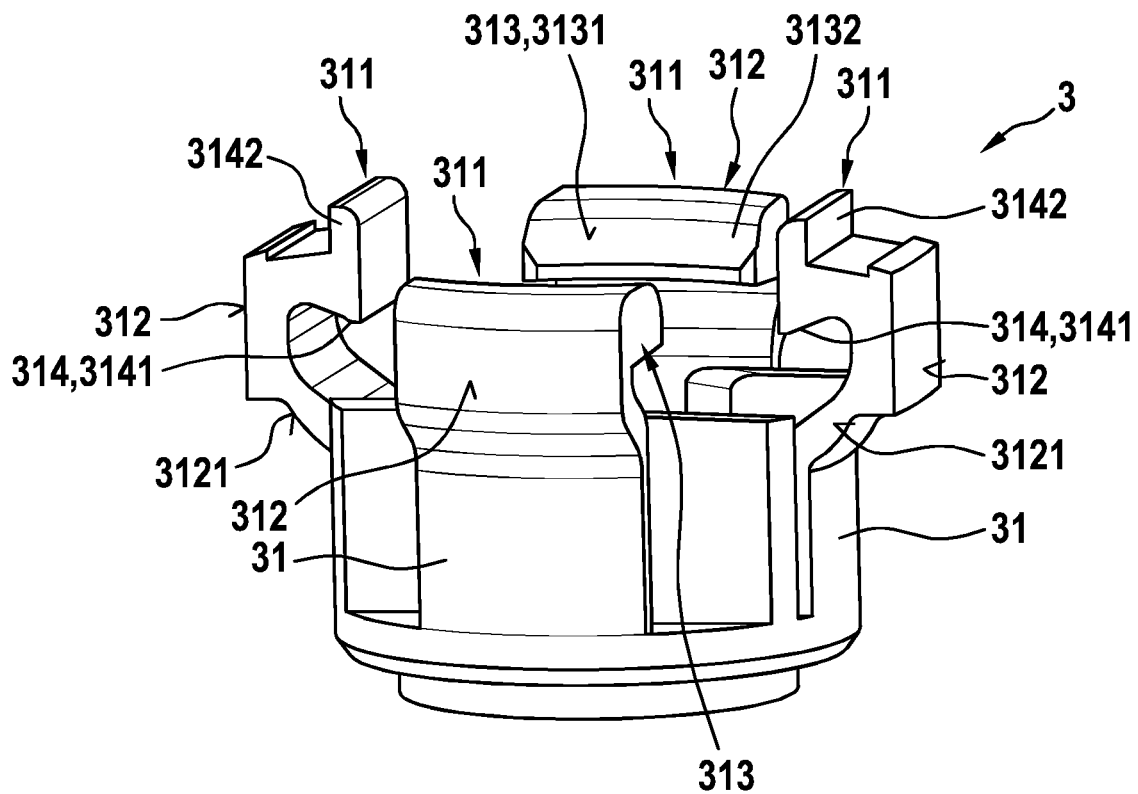
In FIG. 3, the locking element 3 is shown by itself. The locking element 3 has four locking arms 31.

In FIG. 3, the locking element 3 is shown by itself. The locking element 3 has four locking arms 31. The locking arms 31 are aligned axially in such a way that their ends 311 face in the direction of the insertion opening, not shown here, of the coupling sleeve. An actuating/signaling surface 312 which is directed radially outward and differs in color from the other components is arranged in each case at each end 311 of the locking arms 31. Either a blocking lug 313 or 314 which protrudes radially inward into the locking element 3 is in each case arranged radially opposite the actuating/signaling surfaces 312. The blocking lugs 313, which are each in pairs, protrude further inward than the blocking lugs 314, which are also in pairs. An axially aligned guide web 3142 is arranged on the blocking lugs 314 at their inner ends 3141 in each case. In addition, the blocking lugs 314 each have a blocking web on their axial end faces.

The blocking lugs 314 prevent the engaging locking arms 31 from not accidentally being able to be pressed slightly into the interior of the coupling housing 2, when the coupling connector 4 is displaced, in order to avoid the blocking ring 5 sliding over the signaling surfaces 312 although no coupling connector 4 is inserted.

The blocking lugs 313 have inwardly directed bevels 3132 on their axial end surfaces 3131. These serve as an insertion aid for the coupling connector, which is not shown here.

The locking arms 31 have an inclined transition surface 3121 in the transition from the arm to the respective actuating/signaling surface 312.

Figure 4:
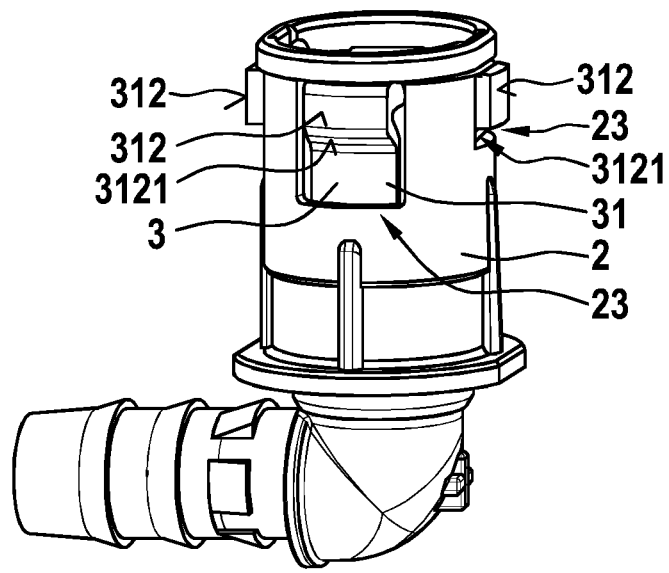
FIG. 4 shows the assembly of the coupling sleeve 2 and the locking element 3.

FIG. 4 shows the assembly of the coupling sleeve 2 and the locking element 3. The locking element 3 is inserted into the interior of the coupling sleeve 2, which is possible by elastic compression of the locking arms 31. The compression is facilitated by the inclined transition surfaces 3121 which slide over the edge of the insertion opening 11 when the locking element 2 is pushed in and press the locking arms inward.

In the position shown, the actuating/signaling surfaces 312 protrude through the openings 23 in the coupling sleeve since the locking arms 31 have sprung back outward into their starting position.

Figure 5:
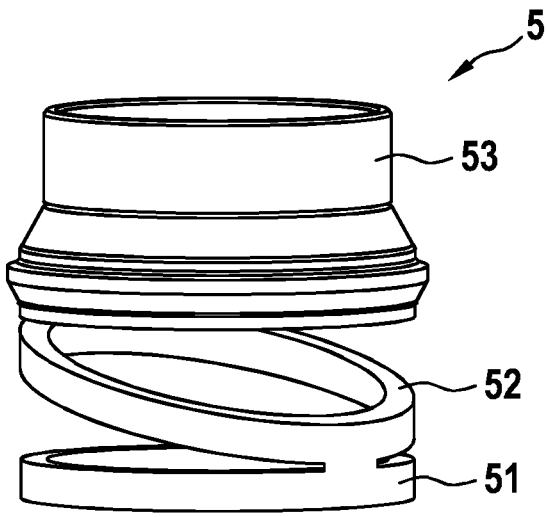
In FIG. 5, the blocking ring 5 is shown by itself in its starting position.

In FIG. 5, the blocking ring 5 is shown by itself in its starting position. The blocking ring has a base part 51, a spring part 52 and a blocking part 53, with the base part 51 and blocking part 53 being spaced apart resiliently variably in the axial direction by means of the spring part 52.

Figure 6:
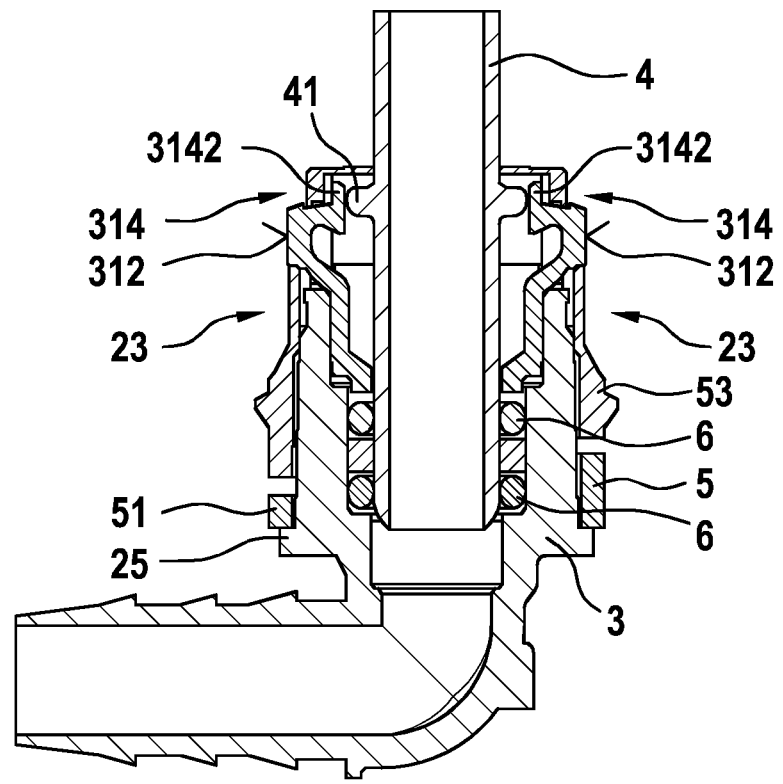
FIG. 6 shows the fluid line coupling 1 according to the invention in the state as it is also shown in FIG. 1, as a longitudinal section.

FIG. 6 shows the fluid line coupling 1 according to the invention in the state as it is also shown in FIG. 1, as a longitudinal section.

The blocking ring 5 is slipped over the coupling sleeve 3 and the actuating/signaling surfaces 312, with the actuating/signaling surfaces 312 being able to spring inward when pushed on. This step is possible only if the coupling connector is not inserted. The base part 51 is now supported against the stop collar 25 of the coupling sleeve 2. When the blocking ring 5 is pushed on, the blocking part 53 can be pushed together in the direction of the base part 51 of the blocking ring 5 such that, in the position shown, the actuating/signaling surfaces 312 are again in their starting position. The blocking part 53 of the blocking ring 5 is now supported axially against the actuating/signaling surfaces 312 protruding outward through the openings 23 in the coupling sleeve 2, and therefore it cannot slide axially over the actuating/signaling surfaces 312. The coupling connector 4 is inserted but not yet locked and protrudes axially into the interior of the coupling sleeve through the seals 6. It is guided radially by the blocking collar 41 and the guide webs 3142 of the blocking lugs 314. Owing to the fact that the blocking lugs 314 do not protrude so far into the interior of the coupling sleeve, the blocking collar 41 fits between the guide webs 3142 with little play.

Figure 7:
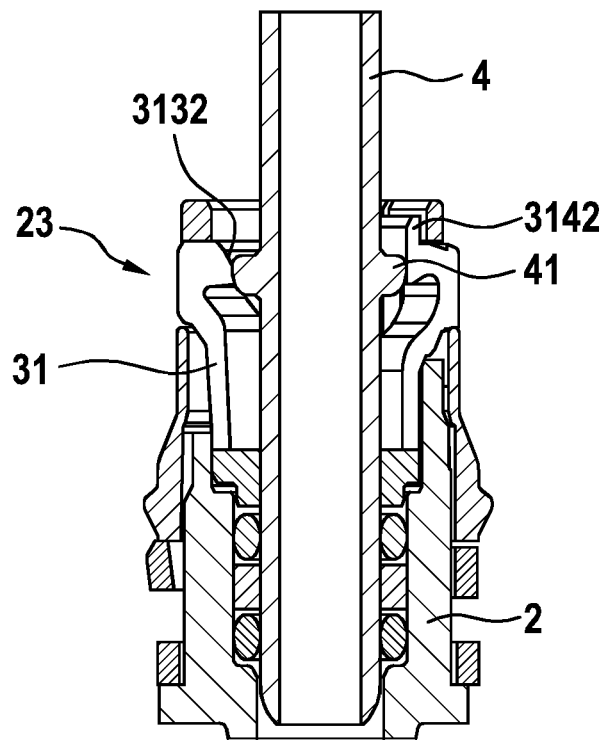
FIG. 7 shows the same state of the fluid line coupling 1 as in FIG. 6. While the blocking collar 41 of the coupling connector 4 slides past the guide webs 3142, it butts against the bevels 3132.

FIG. 7 shows the same state of the fluid line coupling 1 as in FIG. 6. While the blocking collar 41 of the coupling connector 4 slides past the guide webs 3142, it butts against the bevels 3132. As a result, the locking webs 31 concerned can be pushed further outward through the openings 23 in the coupling sleeve 2.

As it is pushed in further, a state that is shown in FIG. 8 is established. The blocking collar 41 now butts against stops 32 of the locking element 3 and pushes the latter axially in front of it. The sloping transition surfaces 3121 are positively guided over the edges of the openings 23 and are displaceable inward as a result.

FIG. 9 shows the locked state of the fluid line coupling 1. The blocking lugs 313 and 314 now reach behind the blocking collar 41 into the interior of the coupling sleeve 3 to such an extent that the coupling connector 4 is locked. At the same time, the blocking part 53 is pushed over the actuating/signaling surfaces 312 by the spring part 52. As a result, it is no longer possible to displace said surfaces outward. The coupling 1 is now firmly locked.

When the coupling 1 is loaded by fluid pressure, the coupling connector is displaceable a small distance in the direction of the insertion opening 11. The locking element 3 is supported on the edges of the openings 23 facing the insertion opening 11 on the coupling sleeve 3, and therefore the coupling connector 4 can no longer slide out.

Owing to the fact that the actuating/signaling surfaces 312 of different color are covered by the blocking part 53, an optical check, in particular with a camera, is possible.

To detach the coupling, the blocking part 53 is displaceable manually in the direction of the base part 51. The actuating/signaling surfaces 312 are thereby releasable and the locking arms displaceable outward. The coupling 1 is detachable again by pulling on the coupling connector 4.

LIST OF REFERENCE SIGNS

Part of the Description

1 Fluid line coupling, coupling
11 Insertion opening in the coupling 1
2 Coupling sleeve
22 Wall of the coupling sleeve 2
23 Openings in the wall 22
24 Connection region of the coupling sleeve 2
25 Stop collar of the coupling sleeve 2
3 Locking element
31 Locking arms
311 Ends of the locking arms
312 Actuating/signaling surface
3121 Transition surfaces
313, 314 Blocking lugs
3131 End surfaces of the blocking lugs 313
3132 Bevels of the blocking lugs 313
3141 Inner ends of the blocking lugs 314
3142 Guide webs on the blocking lugs 314
32 Longitudinal stops in the coupling sleeve 2
4 Coupling connector
41 Blocking collar of the coupling connector 4
5 Blocking ring
51 Base part of the blocking ring 5
52 Spring part of the blocking ring 5
53 Blocking part of the blocking ring 5
6 O-ring seal

The invention claimed is:
1. A reversibly detachable fluid line coupling comprising:
a coupling sleeve, a locking element and a coupling plug connector with a locking collar;
the coupling sleeve has a collar which faces axially outward from a first opening provided for the insertion of the coupling connector and is spaced apart from the insertion opening;
the coupling sleeve has a predetermined number of openings in its outer wall;
the locking element is arranged axially and displaceably inside the coupling sleeve and has a number of resilient locking arms that corresponds to the number of openings in the coupling sleeve;
the locking arms distributed on the circumference of the locking element and extending in the axial direction and having respective actuating signaling surfaces facing radially outward at their axial ends;
the actuating signaling surfaces correspond in shape and position to the openings in the coupling sleeve and protrude resiliently through the openings in the coupling sleeve radially outward from the coupling sleeve;
the fluid line coupling has a blocking ring enclosing the coupling sleeve, the blocking ring having a base part, a spring part and a blocking part, and the base part and blocking part being resiliently variably spaced apart in the axial direction by means of the spring part;
the blocking ring has an inner diameter that can be slid over the outer circumference of the coupling sleeve;
the play between the coupling sleeve and the blocking part being dimensioned in such a way that the blocking part cannot be slid over the actuating signaling surfaces protruding from the openings in the coupling sleeve;

the actuating signaling surfaces have a different color from the blocking part of the blocking ring;

the blocking ring being arranged in the preassembled state on the coupling sleeve in such a way that the base part is supported on the support collar of the coupling sleeve, the blocking part is supported against the actuating signaling surfaces protruding from the openings in the coupling sleeve, and the spring part is pushed together axially, as a result of which an axial spring force is effective between the base part and blocking part;

when the coupling connector is pushed in and locked, the actuating signaling surfaces are displaced in the direction of the interior of the coupling sleeve to such an extent that they no longer protrude from the openings in the coupling sleeve, but are still prevented from sliding out of the coupling sleeve axially by the wall of the coupling sleeve, and therefore the blocking part of the blocking ring is released and is displaced beyond the actuating signaling surfaces in the direction of the push-in opening by the spring force of the spring part of the blocking ring such that the actuating signaling surfaces are no longer visible and are also no longer displaceable radially outward from the openings in the coupling sleeve; and the locking arms have radially inwardly facing blocking lugs, wherein the radially inwardly facing blocking lugs not having insertion aids at the radial ends of the radially inwardly facing blocking lugs and each radially inwardly facing blocking lugs have a guide web which extends in the axial direction.

2. The fluid line coupling as claimed in claim 1, the transition from the locking arms to the radially outwardly directed actuating signaling surfaces has a slope.

3. The fluid line coupling as claimed in claim 2, the locking arms have radially inwardly facing blocking lugs at their axial ends opposite the actuating signaling surfaces.

4. The fluid line coupling as claimed in claim 3, a predetermined number of locking arms has insertion aids in the form of bevels arranged in the axial direction on their blocking lugs, and said blocking lugs protrude radially into the interior of the coupling sleeve to such an extent that, when the coupling connector is pushed in, the locking collar butts against the bevels and therefore the blocking lugs are displaceable radially outward.

5. The fluid line coupling as claimed in claim 1, the locking arms having guide webs each have blocking lugs pointing axially in the direction of the first opening in the fluid line coupling.

6. The fluid line coupling as claimed in claim 1, wherein the entire fluid line coupling is formed from plastic.

7. A reversibly detachable fluid line coupling comprising:
a coupling sleeve, a locking element and a coupling lug with a locking collar;

the coupling sleeve has a collar which faces axially outward from a first opening provided for the insertion of the coupling connector and is spaced apart from the insertion opening;

the coupling sleeve has a predetermined number of openings in its outer wall;

the locking element is arranged axially and displaceably inside the coupling sleeve and has a number of resilient locking arms that corresponds to the number of opening in the coupling sleeve;

the locking arms distributed on the circumference of the locking element and extending in the axial direction and having respective actuating signaling surfaces facing radially outward at their axial ends;

the actuating signaling surfaces correspond in shape and position to the openings in the coupling sleeve and protrude resiliently through the openings in the coupling sleeve radially outward from the coupling sleeve;

the fluid line coupling has a blocking ring enclosing the coupling sleeve, the blocking ring having a base part, a spring part and a blocking part, and the base part and blocking part being resiliently variably spaced apart in the axial direction by means of the spring part, the blocking ring has an inner diameter that can be slid over the outer circumference of the coupling sleeve;

the play between the coupling sleeve and the blocking part being dimensioned in such a way that the blocking part cannot be slid over the actuating signaling surfaces protruding from the openings in the coupling sleeve, the actuating signaling surfaces have a different color from the blocking part of the blocking ring;

the blocking ring being arranged in the preassembled state on the coupling sleeve in such a way that the base part is supported on the support collar of the coupling sleeve, the blocking part is supported against the actuating signaling surfaces protruding from the openings in the coupling sleeve, and the spring part is pushed together axially, as a result of which an axial spring force is effective between the base part and blocking part;

when the coupling connector is pushed in and locked, the actuating signaling surfaces are displaced in the direction of the interior of the coupling sleeve to such an extent that they no longer protrude from the openings in the coupling sleeve, but are still prevented from sliding out of the coupling sleeve axially by the wall of the coupling sleeve, and therefore the blocking part of the blocking ring is released and is displaced beyond the actuating signaling surfaces in the direction of the push-in opening by the spring force of the spring part of the blocking ring such that the actuating signaling surfaces are no longer visible and are also no longer displaceable radially outward from the openings in the coupling sleeve; and the locking element has axially aligned longitudinal stops in an interior.

* * * * *